United States Patent [19]

Tauber et al.

[11] 4,173,719

[45] Nov. 6, 1979

[54] APPARATUS FOR IRRADIATING FLOWING MATERIALS

[75] Inventors: Manfred Tauber, Holm; Dieter Heuer, Uetersen; Max Kröncke, Wedel, all of Fed. Rep. of Germany; Peter Schimmelpfennig, deceased, late of Holm, Fed. Rep. of Germany, by Ella Anneliese Schimmelpfennig, nee Lehmann, sole heir

[73] Assignee: Licentia Patent-Verwaltungs-G.m.b.H., Frankfurt, Fed. Rep. of Germany

[21] Appl. No.: 937,856

[22] Filed: Aug. 29, 1978

[30] Foreign Application Priority Data

Oct. 19, 1977 [DE] Fed. Rep. of Germany ....... 2746917

[51] Int. Cl.$^2$ ............................................. G01N 23/00
[52] U.S. Cl. ..................................... 250/310; 250/364; 250/434; 250/438
[58] Field of Search ................... 250/306, 432 R, 433, 250/434, 310

[56] References Cited

U.S. PATENT DOCUMENTS

| | | | |
|---|---|---|---|
| 1,132,266 | 3/1915 | Helbronner | 250/432 R |
| 1,193,143 | 8/1916 | Henri et al. | 250/437 |
| 2,119,784 | 6/1938 | Johnston | 250/433 |
| 4,116,630 | 9/1978 | Meacham | 250/432 R |

*Primary Examiner*—Harold A. Dixon
*Attorney, Agent, or Firm*—Spencer & Kaye

[57] ABSTRACT

An apparatus for irradiating a flowing material with an electron beam includes an electron beam accelerating device having an electron beam emitter; an irradiation device having an inclined irradiation tray arranged underneath the electron beam emitter and determining a flowpath for the material to be irradiated; and a material feeding arrangement for introducing the material onto the inclined irradiation tray. The material feeding arrangement comprises a riser vessel having an upper portion, a bottom portion and an overflow edge situated at the upper portion and adjoining the irradiation tray upstream thereof as viewed in the direction of material flow and at least one diffuser communicating with the bottom portion of the riser vessel for introducing the material thereinto.

13 Claims, 4 Drawing Figures

APPARATUS FOR IRRADIATING FLOWING MATERIALS

BACKGROUND OF THE INVENTION

This invention relates to an apparatus for irradiating, by means of an electron beam, flowing materials, particularly liquids and pasty masses (such as sewage sludge). The apparatus includes an inclined irradiation tray for guiding the material in a flow path and is arranged underneath the deflecting horn (electron beam emitter) of an electron beam generating device.

A number of devices for irradiating diverse materials are known. Thus, for example, in the periodical "KERNTECHNIK" there is described, in Vol. 18, Issue No. 1 of 1976, pages 20–28, an experimental apparatus in which the liquid to be irradiated is caused to flow from a storage container onto the irradiation tray through an overflow edge. The irradiation tray has an inclined plane on which the liquid to be irradiated flows downwardly while it is irradiated and subsequently, the liquid is received in a collecting vessel. It is a disadvantage of such an arrangement that the liquid to be irradiated has a non-homogeneous flow profile on the irradiation tray and further has a turbulent flow so that a complete uniform irradiation of the liquid cannot be achieved.

SUMMARY OF THE INVENTION

It is an object of the invention to provide an improved apparatus for irradiating liquids and pasty masses, particularly sewage sludge which ensures that the material to be irradiated has a uniform thickness on the irradiation tray and wherein sediments or top crust formations of the material, particularly in the diffuser or in the riser vessel are, in a large measure, prevented.

This object and others to become apparent as the specification progresses, are accomplished by the invention, according to which, briefly stated, the apparatus for irradiating a flowing material with an electron beam includes an electron beam accelerating device having an electron beam emitter; an irradiation device having an inclined irradiation tray arranged underneath the electron beam emitter and determining a flowpath for the material to be irradiated; and a material feeding arrangement for introducing the material onto the inclined irradiation tray. The material feeding arrangement comprises a riser vessel having an upper portion, a bottom portion and an overflow edge situated at the upper portion and adjoining the irradiation tray upstream thereof as viewed in the direction of material flow and at least one diffuser communicating with the bottom portion of the riser vessel for introducing the material thereinto.

Besides a constant uniform layer thickness of the material to be irradiated in the zone of irradiation it is a substantial advantage of the invention that an optimum irradiation efficiency is obtained by a complete utilization of the boundary layers. In the diffuser, in the riser vessel and on the irradiation tray, there are no blind ("no-flow") spaces and thus no settling can occur. With the aid of the apparatus according to the invention, it is possible to adapt in a simple manner the layer thickness of the material to the applied electronic energy and to the electron beam used.

DESCRIPTION OF THE PREFERRED EMBODIMENTS

Figure 1:
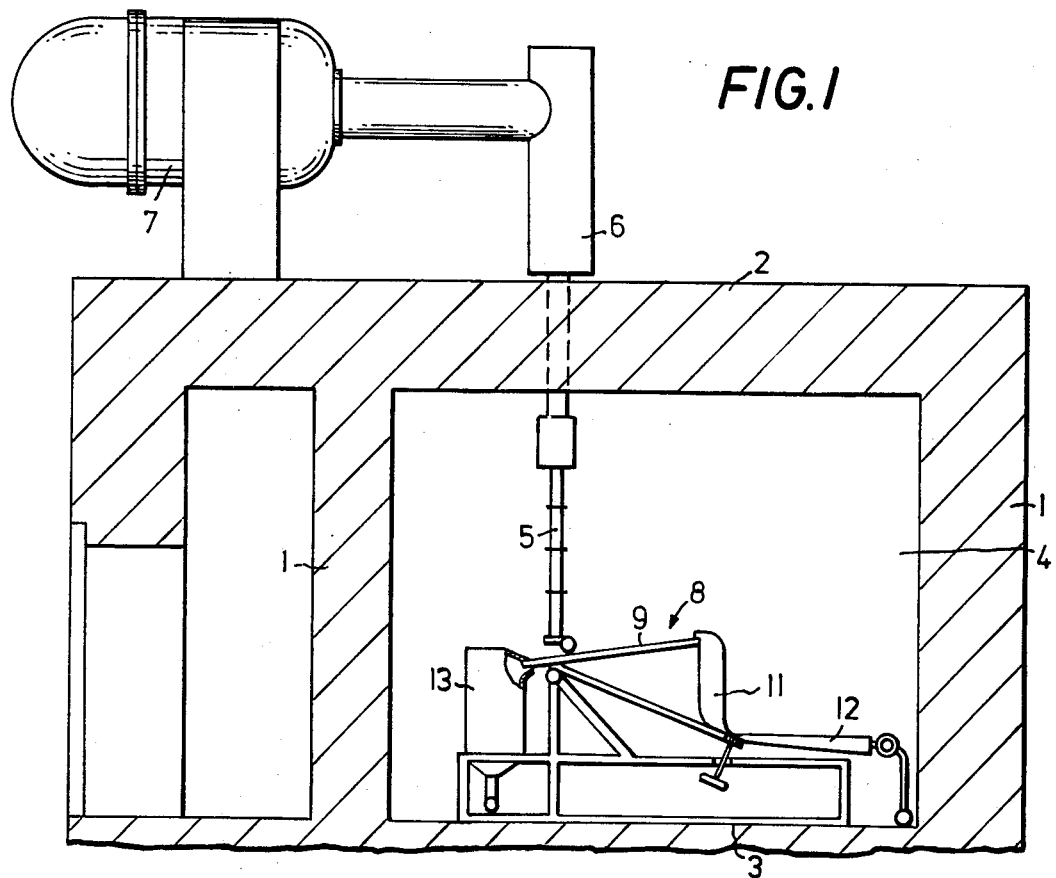
FIG. 1 is a schematic, partially sectional side elevational view of a preferred embodiment of the invention, including an electron beam accelerating device and an irradiation device.

Turning first to FIG. 1, the entire irradiating apparatus shown therein serves for irradiating, by electron beam bombardment, liquids or pasty masses, particularly sewage sludge. For this purpose an irradiation device 8 is arranged in a chamber 4 defined by side walls 1, a top wall 2 and a bottom wall 3. The structure and the operation of the irradiation device will be described in more detail later, in connection with FIGS. 2, 3 and 4. Above the irradiation device 8 there is disposed a deflecting horn 5, the electron accelerator 6 and the accelerator pressure vessel 7 of an electron beam generating device. The components 6 and 7 are arranged in a separate chamber which is expediently arranged above the chamber 4.

Figure 2:
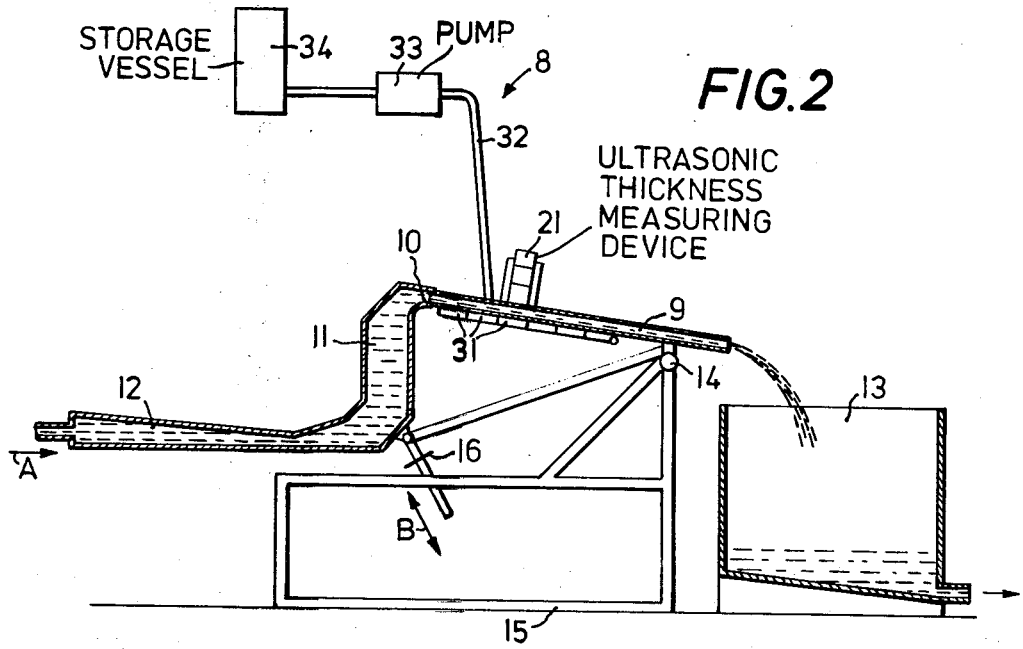
FIG. 2 is a schematic enlarged side elevational view of the irradiation device of FIG. 1.
Figure 3:
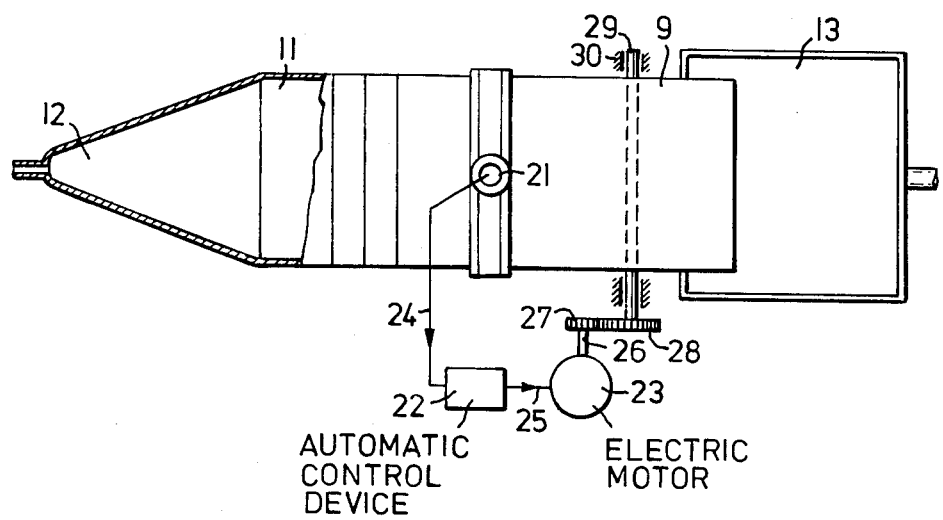
FIG. 3 is a schematic top plan view of the structure shown in FIG. 2.
Figure 4:
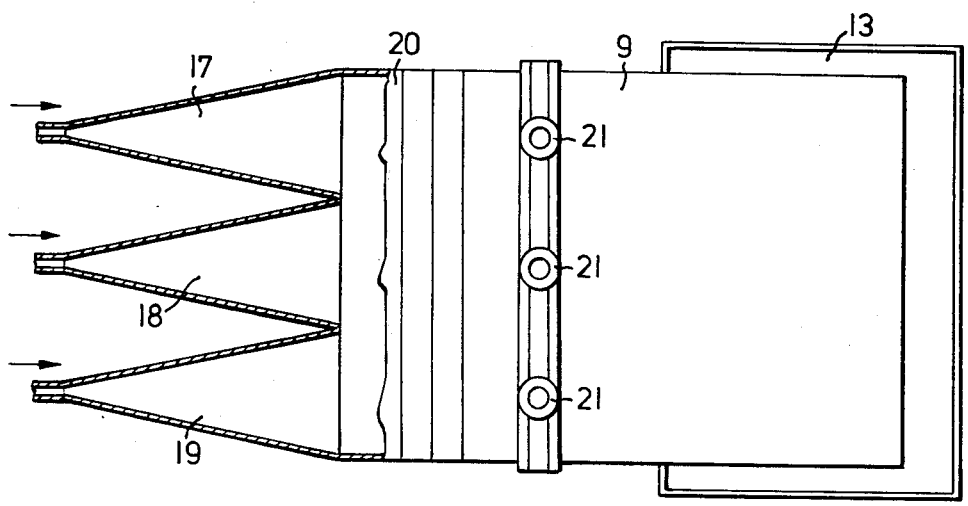
FIG. 4 is a schematic top plan view of a modification of the structure shown in FIG. 3.

Turning now to FIG. 2, the irradiation device 8 includes an irradiation tray 9 having a plane which is inclined to the horizontal. In front (upstream) of the highest part of the irradiation tray 9, there is arranged an overflow edge 10 of a riser vessel 11. The overflow edge 10 extends substantially along the entire width of the irradiation tray 9. The riser vessel 11 has a bottom portion into which there extends the outlet opening of a diffuser 12. As it may be observed in FIG. 3, the outlet opening of the diffuser 12 spreads to the entire width of the riser vessel 11. Instead of the single diffuser 12 illustrated in FIGS. 2 and 3 it is also feasible to use several juxtapositioned diffusers. Such an irradiation device provided with three diffusers 17, 18 and 19 is illustrated in FIG. 4. The diffusers 17, 18 and 19 are arranged in the bottom zone of the associated riser vessel 20 in a plane which is parallel to the bottom of the riser vessel 20. By using several parallel-arranged diffusers there is ensured a uniform layer thickness even on an irradiation tray which has a relatively large width.

In the description which follows the operation of the irradiation device will be described with particular reference to FIG. 2.

The material to be irradiated is introduced by means of the diffuser 12 into the riser vessel 11 in the direction of the arrow A. The flow rate of the material admitted to the the diffuser can be controlled, for example, by a valve arrangement. In the riser vessel 11 the level of the flowing material rises up to the overflow edge 10 and then, passing the same, flows onto the irradiation tray 9. From the latter, the material flows into a collecting vessel 13 subsequent to irradiation by an electron beam emitted from the electron deflecting horn 5. The diffuser 12 and the riser vessel 11 are so structured that in the operational state flow speeds of the material of approximately 0.01 to 0.03 m/sec may occur. The terminal velocity of the material on the inclined plane of the irradiation tray is, besides the admitted quantities, determined in essence by the inclination of the plane of the irradiation tray 9.

An alternation of the flow speed of the material on the irradiation tray 9 is achieved by varying the inclination of the irradiation tray 9 about an axis 14 which is underneath the deflecting horn 5 and which is arranged in the irradiation zone and extends perpendicularly to the flow direction of the material. This axis 14 is substantially horizontal.

In order to achieve a simultaneous tilting motion of the riser vessel 11 and the diffuser 12 together with the tilting motion of the irradiation tray 9 in the direction of the double-headed arrow B, these components are secured to one another to constitute a unitary structure. This structural unit which is easy to manufacture, is secured to a frame 15 which has struts, a joint which is flush with the axis 14 and a device 16 for adjusting the angular inclination. The frame 15 is, together with the collecting vessel 13, supported on a floor.

An angular adjustment of the irradiation tray 9 is expediently performed as a function of the layer thickness of the material flowing downwardly on the tray 9. For this purpose, it is necessary to measure the thickness of the layer; this is effected by means of a supersonic measuring device 21. The adjustment of the irradiation tray 9 may be effected manually or with the aid of an automatic control device 22 and an associated drive 23 as illustrated in FIG. 3. By means of a conductor 24 an input signal which is a measure of the layer thickness is applied to the control device 22, whereupon the control device applies, by means of a conductor 25, a negative or positive setting signal to the electric motor 23, dependent on the input signal. Thereupon the electric motor 23 turns the shaft 29 by means of a motor shaft 26, a pinion 27 meshing with a spur gear 28 which, in turn, is affixed to the shaft 29 having an axis 14. Since the shaft 29 whose fixed bearings are designated at 30, is fixedly connected with the irradiation tray 9, by means of turning the shaft 29, the inclination of the irradiation tray 9 is altered.

The irradiation tray 9 may further be provided with a device for the heat treatment (for example, heating or cooling) of the material. For this purpose, the irradiation tray 9—as illustrated in FIG. 2—is provided at its underside with channels 31, through which a heat-carrying medium, for example, water of predetermined temperature is driven by means of a pump, not shown. By means of a forced heat treatment a phase change of the material can be effected during or subsequent to irradiation. It is further feasible to provide a device for introducing an air stream, oxygen or other gas into the layer of the material in order to achieve a commingling of the material with such additional substances. A simple solution to this effect is the provision of a conduit 32 having a pump 33 which drives a gas from a storage tank 34 into the layer of the material to be irradiated.

It will be understood that the above description of the present invention is susceptible to various modifications, changes and adaptations, and the same are intended to be comprehended within the meaning and range of equivalents of the appended claims.

What is claimed is:

1. In an apparatus for irradiating a flowing material with an electron beam, including an electron beam accelerating device having an electron beam emitter; an irradiation device having an inclined irradiation tray arranged underneath the electron beam emitter and determining a flowpath for the material to be irradiated; and material feeding means for introducing the material onto the inclined irradiation tray; the improvement in said material feeding means comprising
   (a) a riser vessel having an upper portion, a bottom portion and an overflow edge situated at said upper portion and adjoining said irradiation tray upstream thereof as viewed in the direction of material flow; and
   (b) at least one diffuser communicating with said bottom portion of said riser vessel for introducing the material thereinto.

2. An apparatus as defined in claim 1, wherein there are provided three juxtapositioned diffusers each extending perpendicularly to said riser vessel.

3. An apparatus as defined in claim 1, wherein said irradiation tray, said riser vessel and said diffuser constitute a structural unit.

4. An apparatus as defined in claim 3, further comprising means for pivotally supporting said structural unit about an axis situated in a zone of irradiation and extending perpendicularly to the flow direction of the material on said irradiation tray.

5. An apparatus as defined in claim 4, wherein said axis is horizontal.

6. An apparatus as defined in claim 1, further comprising means for pivotally supporting said irradiation tray about an axis situated in a zone of irradiation and extending perpendicularly to the flow direction of the material on said irradiation tray.

7. An apparatus as defined in claim 6, wherein said axis is horizontal.

8. An apparatus as defined in claim 6, further comprising means for measuring the layer thickness of the material flowing on said irradiation tray.

9. An apparatus as defined in claim 8, wherein said means for measuring the layer thickness includes an ultrasonic measuring device supported above said irradiation tray.

10. An apparatus as defined in claim 8, further comprising drive means connected to said means for measuring the layer thickness and to said irradiation tray for automatically altering the angular position of said irradiation tray as a function of the layer thickness.

11. An apparatus as defined in claim 1, further comprising means for a heat treatment of the material flowing on said irradiation tray; said means for heat treatment being attached to said irradiation tray.

12. An apparatus as defined in claim 1, further comprising means for introducing a gas into the material flowing on the irradiation tray.

13. An apparatus as defined in claim 1, wherein said irradiation tray is constituted by a closed receptacle having an opening disposed in the zone of irradiation for providing an entrance passage for the electron beam.

* * * * *